United States Patent [19]

Sutton

[11] Patent Number: 4,934,580
[45] Date of Patent: Jun. 19, 1990

[54] METHOD OF MAKING SUPERPLASTICALLY FORMED AND DIFFUSION BONDED ARTICLES AND THE ARTICLES SO MADE

[75] Inventor: Marvin M. Sutton, Eaton Rapids, Mich.

[73] Assignee: Barnes Group, Inc., Bristol, Conn.

[21] Appl. No.: 290,610

[22] Filed: Dec. 27, 1988

[51] Int. Cl.⁵ ............................................ B23K 19/00
[52] U.S. Cl. ................................ 228/157; 228/173.1; 228/173.6; 228/181; 228/263.21; 72/709; 428/116; 428/593; 428/600
[58] Field of Search ................ 228/44, 15.1, 118, 106, 228/157, 173.1, 173.2, 173.6, 181, 193, 219, 263, 265, 194; 428/116, 204, 593, 594, 600, 660, 614; 156/197; 249/102; 425/522; 72/709

[56] References Cited

U.S. PATENT DOCUMENTS

| | | | |
|---|---|---|---|
| 3,164,894 | 3/1960 | Johnson et al. | 228/157 |
| 3,340,589 | 3/1964 | Jaeger | 228/157 |
| 3,632,410 | 1/1972 | Vargo | 117/114 R |
| 3,633,267 | 1/1972 | Deminet | 29/493 |
| 3,703,032 | 11/1972 | Batista | 29/493 |
| 3,747,197 | 7/1973 | Riel | 29/470.9 |
| 3,768,985 | 10/1973 | Woodward | 29/191 |
| 3,800,406 | 4/1974 | Hagan et al. | 29/480 |
| 3,809,309 | 5/1974 | Batista | 228/44 |
| 3,817,844 | 6/1974 | Kendall | 204/15 |
| 3,920,175 | 11/1975 | Hamilton et al. | 228/173 |
| 3,942,231 | 3/1976 | Whitaker | 29/156.8 |
| 3,957,194 | 5/1976 | Woodward | 228/194 |
| 3,981,429 | 9/1976 | Parker | 228/194 |
| 4,025,036 | 5/1977 | Melnyk | 228/193 |
| 4,029,254 | 6/1977 | Blair et al. | 228/181 |
| 4,029,479 | 6/1977 | Parker | 428/660 |
| 4,059,217 | 11/1977 | Woodward | 228/181 |
| 4,087,037 | 5/1978 | Schier et al. | 228/106 |
| 4,197,977 | 4/1980 | Deminet | 228/106 |
| 4,197,978 | 4/1980 | Kasper | 228/173 A |
| 4,204,628 | 5/1980 | Houston et al. | 228/106 |
| 4,210,269 | 7/1980 | Shilling et al. | 228/193 |
| 4,217,397 | 8/1980 | Hayase et al. | 428/594 |
| 4,218,007 | 8/1980 | Shilling et al. | 228/194 |
| 4,230,614 | 10/1980 | Arnold et al. | 260/333.6 |
| 4,242,176 | 12/1980 | Riel | 156/630 |
| 4,252,263 | 2/1981 | Houston | 228/193 |
| 4,257,156 | 3/1981 | Houston | 29/580 |
| 4,263,375 | 4/1981 | Elrod | 428/594 |
| 4,288,021 | 9/1981 | Leodolter | 228/15.1 |
| 4,292,375 | 9/1981 | Ko | 428/593 |
| 4,304,350 | 12/1981 | Paez et al. | 228/118 |
| 4,304,821 | 12/1981 | Hayase et al. | 428/593 |
| 4,312,906 | 1/1982 | Arnold et al. | 428/204 |
| 4,318,965 | 3/1982 | Blair | 428/593 |
| 4,350,528 | 9/1982 | Engle | 75/203 |
| 4,351,470 | 9/1982 | Swadling et al. | 228/157 |

(List continued on next page.)

OTHER PUBLICATIONS

Effective Applications for Superplastic Forming and Diffusion Bonding for the Engineering Specialist–Compilation of Technical Papers Presented at Meeting of Soc. of Manu. Eng., 6/21–22, 1988.

A. F. Evans and J. L. Bartos, Quality Assurance–The Key to Advanced Aircraft Applications of the SPF/DB Process.

(List continued on next page.)

Primary Examiner—Nicholas P. Godici
Assistant Examiner—Mike Starkweather
Attorney, Agent, or Firm—Pennie & Edmonds

[57] ABSTRACT

Methods of making superplastically formed and diffusion bonded articles are disclosed as well as the articles made from such methods. Metal sheets are superplastically formed and diffusion bonded in a manner such that pillows are formed on respective outer surfaces thereof, providing a cellular structure interconnected by channels permitting control of gas pressure with the cells. The cellular structure can, in one embodiment, be twisted and the cells can be inflated through superplastic forming. The twisted cellular structure is particularly useful as an intermediate stiffener for an airfoil.

21 Claims, 3 Drawing Sheets

U.S. PATENT DOCUMENTS

| | | | |
|---|---|---|---|
| 4,392,602 | 7/1983 | Darby | 228/118 |
| 4,393,987 | 7/1983 | Anderson et al. | 228/157 |
| 4,394,871 | 7/1983 | Czajka et al. | 137/115 |
| 4,395,310 | 5/1983 | Houston | 357/68 |
| 4,415,375 | 11/1983 | Lederich et al. | 148/11.5 F |
| 4,427,716 | 1/1984 | Siwek | 427/99 |
| 4,429,824 | 2/1984 | Woodward | 228/157 |
| 4,444,352 | 4/1984 | Glascock, II et al. | 228/193 |
| 4,460,657 | 7/1984 | Elrod et al. | 428/600 |
| 4,469,757 | 9/1984 | Ghosh et al. | 428/614 |
| 4,474,044 | 10/1984 | Leistner et al. | 72/13 |
| 4,483,478 | 11/1984 | Schulz | 228/157 |
| 4,500,033 | 2/1985 | Schulz et al. | 228/219 |
| 4,509,671 | 4/1985 | Weisert | 228/157 |
| 4,522,859 | 6/1985 | Blair | 428/116 |
| 4,526,312 | 7/1985 | Goss et al. | 228/157 |
| 4,530,197 | 8/1985 | Rainville | 52/797 |
| 4,534,503 | 8/1985 | Stephen et al. | 228/157 |
| 4,549,685 | 10/1985 | Paez | 228/118 |
| 4,577,798 | 3/1986 | Rainville | 228/157 |
| 4,584,860 | 4/1986 | Leonard | 72/61 |
| 4,603,808 | 8/1986 | Stacher | 228/265 |
| 4,641,334 | 2/1987 | Devine, Jr. | 378/144 |
| 4,642,863 | 2/1987 | Schulz | 29/156.8 |
| 4,649,249 | 3/1987 | Odor | 219/10.73 |
| 4,658,362 | 4/1987 | Bhatt | 364/472 |
| 4,708,008 | 11/1987 | Yasui et al. | 72/60 |
| 4,715,055 | 12/1987 | Devine, Jr. | 378/144 |
| 4,722,754 | 2/1988 | Ghosh et al. | 148/11.5 A |

OTHER PUBLICATIONS

Edward D. Weisert, Diffusion Bonding of SPF/DB Turbofan Fan Blades–Presented at 6th International Conference on Titanium, Cannes, France, Jun. 6-9, 1986.

New Technologies for Tornado also applicable to Airbus.

C. A. Behringer, Superplastic Forming-an Elegant Solution, Manufacturing Engineering, 41 (Jan., 1987).

E. D. Weisert, Hollow Titanium Turbofan Blades–Presented at the Annual Meeting of the Metallurgical Society, AIME Symposium on "Superplasticity in Aerospace", Phoenix, Arizona (Jan. 25-28, 1988).

F. Haflich and S. L. Jones, SPF Use on Structural Parts to Debut on False Fighter, American Metal Market/Metalworking News (Nov. 3, 1986).

Aircraft Engine Bays are Superplastically Formed of Titanium, Advanced Materials & Processes, Inc., Metal Progress, p.24(12-86).

LTV Developing New Uses for Superplastic Forming, Aerospace Daily, p. 333 (Dec. 3, 1986).

Incoform Brochure-Special Shapes in Exotic Alloys.

MBB Transport Aircraft Group-Technology Letter: High-Pressure Forming a New Production Technology in Aircraft Const (Jun., 1986).

R. D. Stutz, Computerised Integrated Automated Manufacturing, Sheet Metal Industries (May 1984).

METHOD OF MAKING SUPERPLASTICALLY FORMED AND DIFFUSION BONDED ARTICLES AND THE ARTICLES SO MADE

BACKGROUND OF THE INVENTION

1. Field of the Invention

The present invention relates to a method of making superplastically formed and diffusion bonded articles and the articles made thereby. The method and articles are particularly well suited for stiffened cellular panel structures useful for hollow airfoils, wing panels, duct work, cases (e.g. the flanged tube forming part of the casing of the engine) and frames (i.e. part of the bearing support) for example. It is especially suited, in certain embodiments, to the manufacture of compound curvature airfoil structures such as compressor or fan rotor and stator airfoils.

2. Description of the Background Art

Superplasticity is the flow characteristic, analogous to that exhibited by a viscous fluid, demonstrated by certain metals which exhibit unusually high tensile elongations without necking, i.e. with uniform reduction in cross-sectional area when elongated, within limited temperature and strain rate ranges. This phenomenon, peculiar to titanium alloys and to certain other metals and metal alloys, has been exploited for producing a variety of articles, especially those having intricate and complex shapes with small radii of curvature.

It is further known that at these same superplastic forming temperatures the same materials can be diffusion bonded with the application of pressure at contacting surfaces. Diffusion bonding is a process which forms a metallurgical bond by the application of heat and pressure to metallic pieces held in intimate contact for a specific length of time. Bonding is thought to occur by the movement of atoms across adjacent faces of the pieces and is a function of time, temperature and pressure. The process is unique in that it allows metals to be joined without significantly changing their physical or metallurgical properties at the joint and with minimum geometrical distortion.

The fabrication of articles by various combinations of superplastic forming and diffusion bonding steps began in the early 1970's in response to the need for light weight, high strength and stiffness airfoils, to reduce the disc rim load, and also for ducts, frames and similar structures, particularly for aircraft and spacecraft. In one early technology, still in use today, the workpieces were bonded only at selected sites, and bonding was prevented at nonselected locations by a coating of maskant, or stopoff. This was necessary to enable the workpieces to be shaped by superplastic forming without bonding at such locations. The early use of maskants is exemplified in U.S. Pat. No. 3,920,175.

The known maskants, of which Boron nitride and Yttrium oxide are the most common, produce contamination which can seriously impair the integrity of the resulting bonds. Embrittlement can also result. In complex structures, especially hollow core structures that employ cellular stiffening cores, it is impossible to totally remove the maskant. Furthermore, since the maskants are typically brushed onto the areas to be precluded from bonding by hand, areas of erratic and inconsistent bonding are likely to occur. Hence the use of maskants is also limited to relatively simple structures and wide joint areas. Contamination is also likely to occur with maskants, preventing reliable bonding.

The serious problems associated with maskants were recognized in the art at least as early as 1976 in U.S. Pat. No. 4,087,037 (see in particular Col. 1 lines 20-42 and lines 55-58; see also U.S. Pat. No. 4,304,821, Col. 1, lines 45-56) which describes a method and press machinery for producing superplastically formed and diffusion bonded articles without the necessity for maskants. The patent proposes avoiding the necessity for maskants by using a complex press capable of sequentially controlling the process to allow completion of the superplastic forming steps before the parts are allowed to contact each other for diffusion bonding. This is achieved in part through the use of a limiting die and a mating flexible die, it being necessary to pressure-form before reaching diffusion bonding temperatures. Note that the patent teaches the necessity of avoiding accidental contact of surfaces not to be bonded, as undesired bonding may lead to significant damage (Col. 3, lines 29-34). Although the patent suggests the ability of the disclosed machinery to form large area structures with compound curvature, applicant is not aware of any significant commercial use of such machinery (or for that matter of any machinery or methodology) for that purpose.

Another approach to avoiding maskants has been to seam weld two or more metal sheets together in a pattern of bonds, and then to superplastically form a honeycomb of connected cells by inflating the welded sheets at temperature, sometimes bonding to external sheets at the same time. Such welding processes are shown for example in U.S. Pat. Nos. 4,351,470, 4,304,821, and 4,217,397, the earliest of which was filed in 1978.

A seam welded bond pattern has certain drawbacks, however, in that it cannot be controlled accurately in enough detail to achieve uniform width bonds, particularly for detailed configurations, and also necessitates a relatively wide bond width leading to undue fracturing stress when the side walls of adjacent cells formed in the metal sheet have to double back on themselves during inflation to meet in the middle of the weld lines. Also, seam welding tends to produce unreliable bonding because the gaps left intentionally between the welds may undergo diffusion bonding, at temperature, thereby precluding the desired fluid communication necessary to achieve uniform superplastic forming. As a result welded structures have in general not been desired for highly stressed parts, particularly for the fabrication of critical parts such as fan airfoils U.S. Pat. No. 4,351,470, referred to above, mentions briefly that "instead of welding, the sheets could be fixed together by some other means, for example by diffusion bonding." [sentence spanning Col. 2-3.] Nevertheless, it does not explain how to achieve such a pattern of diffusion bonding. Since it was recognized that care must be taken to avoid contact at surfaces other than those to be bonded (see, e.g. U.S. Pat. No. 4,087,037, Col. 3, lines 29-34; U.S. Pat. No. 4,304,821, Col. 1, Lines 39-42), presumably the quoted sentence contemplated the use of stopoff or spacers (which pose problems similar to stopoff and additional problems as well) for that purpose.

In addition to the problems posed by the use of maskants and welding and problems ascribed to local thinning of metal during forming (see e.g., U.S. Pat. No. 4,351,470 Col. 1, lines 33-37), problems also arise from the numerous thermal cycles which the structural components undergo in prior processes, which have a debilitating effect on the resulting structure.

Still another serious drawback of certain prior art methods, particularly (but not exclusively) those employing stopoff, is that they make it impossible to inspect and assess the integrity of the bonds after they are formed, since the bonded portions are rendered inaccessible by the fabrication process. This problem is particularly acute when the cellular structure is used as a hollow core for an airfoil, where the cellular structure is sealed as it is formed between the two outer skin layers. Since a large fraction of the cost of the finished structure may be associated with the airfoil itself, as opposed to the stiffening core, such processes are often not economically feasible due to the high reject rate.

Despite the prior attempts to achieve a commercially feasible method of superplastically forming and diffusion bonding articles without maskants or welding, and without using cumbersome and expensive equipment, applicant is unaware of any commercially successful result to date. The lack of a successful method is particularly noteworthy with respect to the manufacture of intricately shaped compound curvature airfoil structures as well as complex structural members such as frames or the structural elements of such members.

SUMMARY OF THE INVENTION

Broadly stated, in order to overcome the drawbacks described above, structures are made in accordance with the present invention by placing one or a pair of metal sheets between at least one and preferably a pair of platens, which contact the sheets along a ribbon surface defining in its interstices an array of polygonal voids intercommunicating with one another through reliefs formed in the ribbon surface. When the sheets are pressed together by the platens, at temperature, the metal contacted along the ribbon surface flows into the adjacent non-contacted polygonal areas of the sheets causing them to flow outwardly, to form an array of pillow-shaped cells interconnected by a network of channels corresponding to the above mentioned reliefs. When the sheets are bonded together, the cells can be inflated by gas pressure applied through an inlet tube at the perimeter of the sheets and providing communication to all the cells via the network of channels.

The invention is based in part on the discovery that by thus upsetting the sheets along such a ribbon surface, the metal of the sheets can be made to flow into the interstitial polygonal areas, causing them to raise or (in the case where two sheets are formed at the same time) separate by an amount sufficient to form interconnected pressurizable pillow-shaped cells; that even without maskants, the pillowed area of the sheets will not become bonded together at diffusion bonding temperatures; and that this affords a new and useful way of forming reinforced metal stiffening structures. It has also been discovered that preforms made in this fashion may be further processed to produce integral compound curvature reinforcing structures for compressor and fan rotor or stator blades and similar airfoil structures. It is believed that each sheet forms pillows extending toward the adjacent platen by virtue of some affinity, akin to a surface tension effect, between the metal sheet and the adjacent platen during the forming process. As used herein, the term "pillow" is meant to define a pillow-shaped displacement or bump in the surface of the metal sheet, formed when the sheet is upset by a platen along a ribbon surface. Each pillow corresponds to one of the polygonal voids in the corresponding platen. In turn, a "cell" is comprised of two abutting pillows in back-to-back relation created when two metal sheets are simultaneously formed or otherwise juxtaposed so that they can form an inflatable volume. Hence if a single sheet is formed alone, a platen and an opposing flat surface should be used. If two metal sheets are formed in this manner in the same operation, then either a platen and an opposing flat surface may be used or two opposed platens, as described below.

In accordance with a preferred embodiment of the invention, the upset forming described above is performed for a time less than or at a temperature below that required for diffusion bonding. The resulting formed sheets may then be cleaned and welded or otherwise joined along their perimeter, and a fluid communication tube inserted and welded between them in order to control the pressure throughout the network of interconnected cells resulting when they are bonded together. The volume between the sheets is then preferably evacuated to assure complete bonding, and the sheets again subjected to direct mechanical pressure between the forming platens at diffusion bonding temperature to bond them together along the ribbon surface. The platens are then removed and the resulting preform, still at temperature, is pressurized with an inert gas to expand the interconnected cells by superplastic flow.

Alternatively, the sheets may be both formed and bonded in a single operation by maintaining the platens in place at temperature for long enough to permit diffusion bonding. The platens are then removed and the preform, still at temperature, pressurized as described above to inflate the cells to the desired volume. This operation is preferably performed in a vacuum furnace, to achieve the same effect as evacuating the volume between the sheets (described above) but without having to weld the periphery of the sheets and inlet tube first. The peripheral bond in this embodiment may be formed by fashioning the platens or other mold elements to diffusion bond the periphery of the sheets, leaving an opening for gas communication. A tube may also be welded or diffusion bonded into the opening if desired.

The expansion of the cells of the preform as described above may be free expansion or may be confined by the interior surface of a mold, preferably replicating the interior surface of the desired final structure. If free expansion, the cells are preferably not inflated to the degree that their adjacent sides contact and begin to bond with one another, that being left for a final step where the partially expanded core is bonded to other exterior structural elements If confined expansion, the cells are preferably inflated such that their sides are bonded along their entire surfaces to adjacent cell walls, and the ends of the cells form a smooth, substantially continuous surface bondable to an exterior (i.e., exterior to the core structure) wall such as an airfoil skin or a frame surface.

Further, in accordance with the invention the preform may be subjected to an initial small degree of pressurization, sufficient to prevent kinking when warped, twisted or otherwise formed, and then further inflated in one or more peripheral molds which impart a controlled "twist", or bi-directional curvature, to the preform corresponding to or leading to its final desired shape.

While the platens are described herein as defining polygons, the term is used broadly to include circles as well as polygons with any number of sides. Preferably, the polygonal shape selected is one affording a regular array of cells separated by a constant width ribbon surface. The preferred embodiment for practical purposes is the hexagonal pattern shown in the accompanying drawings For some applications, a smaller number of sides should be avoided because the sharper corners that result are more likely to fail, as the cells are pressurized and inflated, than for polygons with a larger number of sides. octagons, decagons and dodecagons are also useful since they afford a regular polygon array defining a constant width ribbon surface. The geometry of a square as a polygon, while useful for some applications, generally does not provide uniform stiffening to the same degree as the preferred geometries.

The resulting structures in accordance with the invention preferably have bonded double walls, where the adjacent cells bond to one another, and no internal unbonded voids, the entire end surface of each cell being capable of bonding to an adjacent skin or wall. Further, the pattern of polygonal cells may be varied and may for example be made smaller or larger across particular areas, thereby "tuning" the wall thickness and dimensions of the reinforcing structure to avoid unwanted vibrational resonances, or for thicker or thinner reinforcing walls, or for other reasons dictated by the desired characteristics of the end product.

The degree of upset imparted by the platen to the metal sheets during forming may be from a few percent to about 10%, preferably about 5%, upset being defined as the percent reduction in thickness of the metal sheet at the ribbon surface caused by the platens. For example, a 0.002" reduction in a 0.040" sheet is a 5% upset. In accordance with the invention, the platens are brought together against positive stops, so that the predetermined upset is accurately and controllably achieved. Such stops may be structural components between the platens limiting their closure or may include alternative electronic or mechanical means for achieving the same end result. Only nominal pressure is required for this purpose.

A pair of platens is preferred in accordance with the invention for deep reinforcing structures, since gas pressure then causes the cells to expand uniformly in both directions from the plane of the metal sheets, for maximum depth. For certain shallow structures, however, a single platen operating in conjunction with an opposing planar surface is preferred since the resulting upset will occur only in the sheet contacting the contoured platen, leading only that sheet (since it is thinner after upset) to inflate into an expanding cell upon pressurization. The resulting structure thus has only half the depth compared to one in which both opposed surfaces of each cell undergo inflation. The degree of inflation of the cells depends on the desired thickness of the cell walls, which will depend upon the structural requirements of specific applications. Generally, 50% reduction in wall thickness is acceptable, but for some applications the walls may be thinned to within only a few percent of their original thickness.

In one embodiment of the invention, the cellular panel structure is twisted to conform to the hollow core of an airfoil and is embedded in and bonded within the airfoil. To this end, a pair of airfoil skin layers are machined to form an internal cavity. The partially formed cellular panel structure is then positioned between the skin layers and the skin layers are bonded together about their periphery, with gas tubes giving access to the volume within the panel structure and to the volume between the panel structure and the airfoil cavity. The resulting structure is subjected to superplastic flow temperature, and gas pressures are controlled to apply pressure inside the panel structure and to reduce pressure between the latter and the airfoil cavity, to diffusion bond the cell end walls to the skin layers and thereby form a hollow integral core reinforced airfoil.

The method used to fabricate the cellular panel (or core) structure and resulting articles of the present invention overcomes those problems associated with maskants and welding and alleviates the problem of local thinning attendant previous methods. Furthermore, the equipment used to practice the method is relatively uncomplicated and hence is reliable and inexpensive. Importantly, since the cellular preform and core may be fabricated independently of the final article in which the core is to be incorporated, they are readily accessible to assess the integrity of the bonds and the structure before being incorporated in or bonded to additional structural components to form that article.

The method of the invention can be used to fabricate stiffened cellular panel or core structures for any application, and to fabricate structural elements such as ducts, frames, struts, airfoils and the like which employ an internal light weight reinforcing core that is capable of bonding integrally to the element. The cellular structures have high strength to weight ratios and are very stiff and consequently are well suited for use as strengthening cores for hollow core structural elements.

BRIEF DESCRIPTION OF THE DRAWINGS

Preferred embodiments of the invention will be described in conjunction with the accompanying drawings, in which.

DESCRIPTION OF PREFERRED EMBODIMENTS

Figure 1:
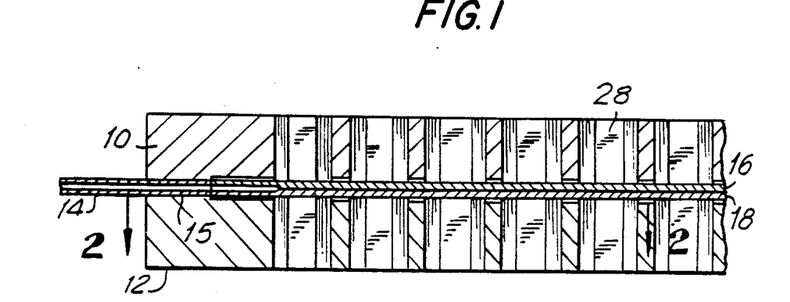
FIG. 1 is a cross-sectional view of two metal sheets disposed between opposing platens of a tool prior to superplastic forming and diffusion bonding.
Figure 2:
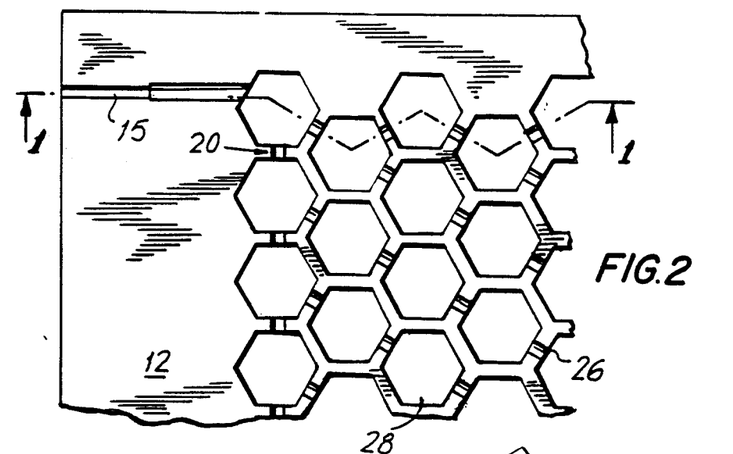
FIG. 2 is a sectional plan view of the lower platen illustrated in FIG. 1.
Figure 3:
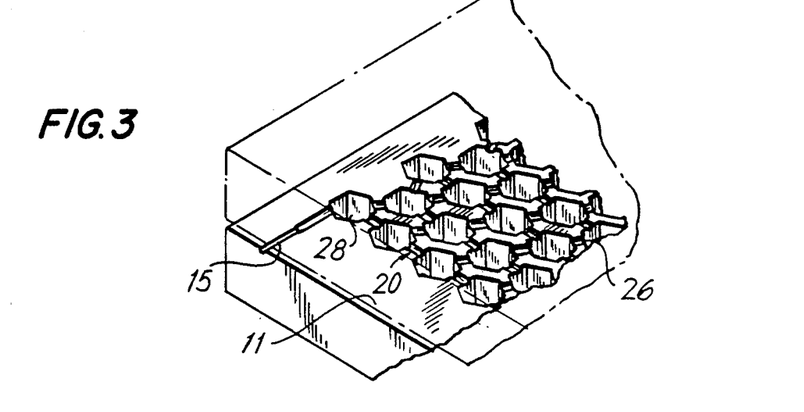
FIG. 3 is a partial perspective view at the parting line of the platens shown in FIGS. 1 and 2, without the metal sheets between them and with the upper platen shown in phantom line.

The molds, or platens, used in accordance with the invention are illustrated in FIGS. 1-3, showing an embodiment in which the platens form a hexagonal pattern. Two platens 10,12 are shown in FIG. 1, sandwiching between them a pair of metal sheets 16,18. As shown in FIG. 2, platen 12 (and, similarly, platen 10) provides an operative ribbon surface 20 disposed to form a corresponding ribbon surface 22 on the resultant preform 24 shown in FIG. 4, which is formed of metal sheets 16 and 18 in a manner to be described. Platen ribbon surface 20 forms in its interstices an array of polygonal voids or cavities 28. The platens also have a pattern of reliefs 26 in the platen ribbon surface 20, interconnecting the polygonal cavities 28. The pattern of reliefs 26 should permit gas pressure applied through an external tube 15 to be communicated to all of the polygonal voids as illustrated in FIGS. 2 and 3.

Figure 10:
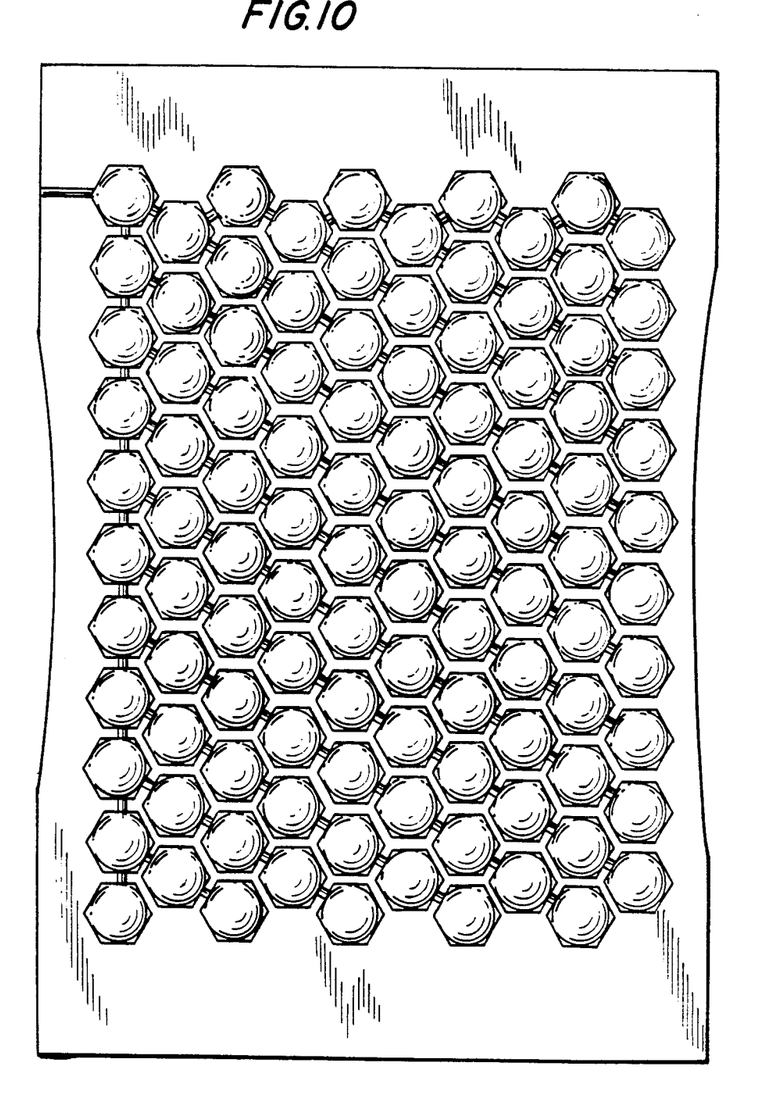
FIG. 10 is a plan of cell interconnections that may be formed to provide a gas path in accordance with the invention.

An example of a pattern of reliefs for this purpose is shown in FIG. 10; any relief pattern may be used which affords adequate gas pressure throughout the cells to achieve the desired inflation. More than one tube 15 may be provided for this purpose if desired, although it is believed that a single one is sufficient for most applications.

Figure 1A:
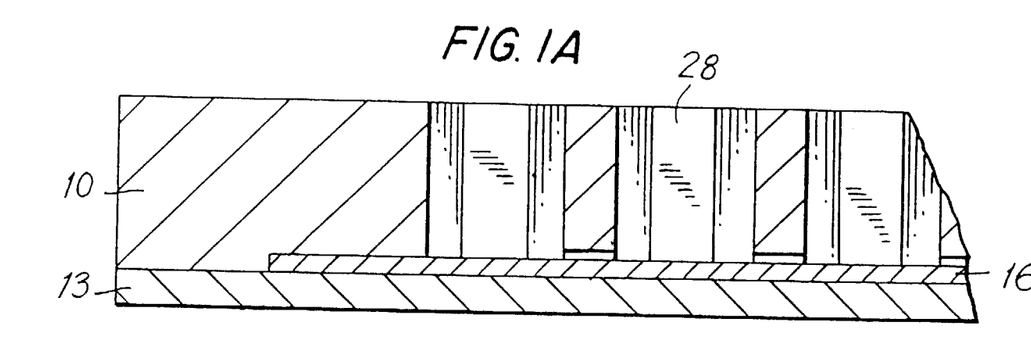
FIG. 1A is a cross-sectional view of a single metal sheet disposed between a platen and an opposing flat surface of a tool prior to superplastic forming and diffusion bonding.
Figure 1B:
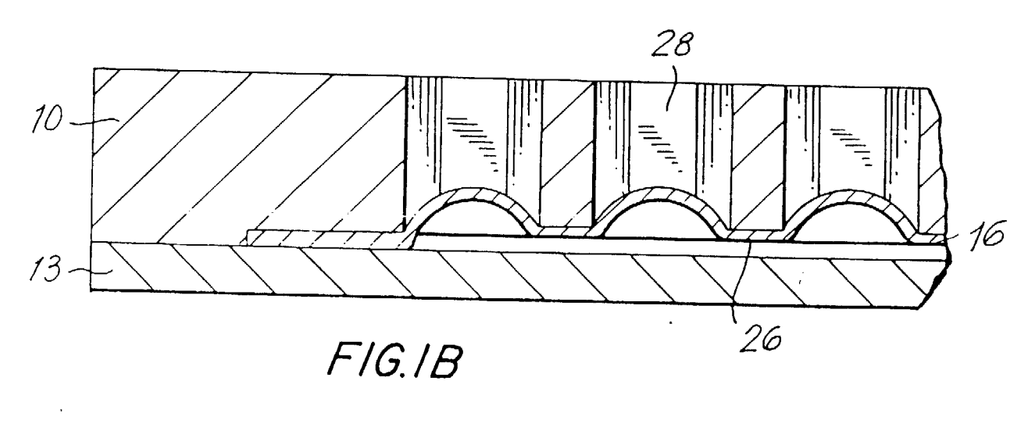
FIG. 1B is a cross-sectional view similar to that of FIG. 1A illustrating the appearance of the single sheet as it is upset along the ribbon surface.

Alternately, if desired, the invention described herein may be utilized to superplastically form a single sheet, rather than a pair of such sheets as described above. The apparatus utilized for carrying out this process is illustrated and described with regard to FIGS. 1A and 1B. FIG. 1A depicts a single metal sheet 16 sandwiched between platen 10 and opposing flat platen 13. As shown in FIG. 1B, platen 10 provides an operative ribbon surface disposed to form a corresponding ribbon surface upon sheet 16 when sheet 16 is compressed between platen 10 and flat platen 13 and subjected to temperatures at or substantially within the range of superplasticity for the particular material chosen. FIG. 1B thus illustrates schematically the appearance of sheet 16 as it undergoes the forming process.

In accordance with the preferred embodiment of the invention, platens such as those shown in FIGS. 1 and 2 are brought to bear upon a pair of metal sheets capable of being superplastically formed and diffusion bonded, and the platens forced together to produce from a few percent to about 10% upset of the sheets in the area of ribbon surface 22. In accordance with the invention, it has been discovered that a useful preform may be made in this fashion without the use of stopoff or any other kind of adhesion inhibitor, and without the necessity for controlling the relative pressures within and without the sandwich formed by the metal sheets. Upsetting the metal in the disclosed pattern causes the excess metal to flow into the adjacent polygonal cavities of the platen, thereby forming polygonal cells 32. Similarly, the metal of sheets 16 and 18 flows into the pattern of reliefs 26 forming a corresponding pattern of bleed ports 30 interconnecting the cells 32.

The method may be performed in a conventional hot press or vacuum furnace, using conventional press machinery such that the platens may be brought together against positive stops to the distance required for the predetermined degree of upset. For example, if two sheets each 0.040 inches thick are used, the stops should be set to limit platen separation to 0.076 inches, to achieve a 0.002 inch or 5% upset in each sheet.

Ribbon surfaces 20 are preferably made narrow and of constant width, preferably about 0.040–0.060 inches. They have to be wide enough to achieve bonding when the platens are brought together, and for strength during the forming process, and should be narrow enough to avoid undue bending stress when adjacent cell walls double back on themselves during pressurization to meet along the bond line. The ribbon surfaces may also be of differing widths, and even a random distribution of polygons may be employed, differing randomly in size, shape or orientation over the surface of the sheet. The desired ribbon width will depend necessarily on the thickness of the metal sheets, the particular alloy used, the size and geometry of the polygons, the desired degree of cell growth and the desired characteristics of the resultant product. The process is particularly useful in that it permits fabricating core structures from relatively thin metal sheets, of the order of 0.020 inches, to achieve very light weight structures without undue local elongation, or necking, of the metal of the cell walls.

Complimentary platens 10 and 12 may form an open mold, as shown, or alternatively they may form a closed cavity mold (not shown), in which cell growth may (but need not) be limited by the proximity of the internal mold surface. It will be appreciated that open molds are less expensive to machine.

The platens may also form an exterior or perimeter surface 11 (FIG. 3) producing a diffusion bonded area of desired width encircling substantially the entire preform and configured to leave channels 15 as desired for gas communication, as will be described. Alternatively, a separate pair of platens (not shown) may be used in conjunction with those shown in FIG. 1 to produce the perimeter bond.

The metal or metal alloys that may be used in accordance with the invention are those materials capable of undergoing superplastic forming and diffusion bonding. They preferably are capable of undergoing large plastic deformation, from a few hundred percent up to about 1000% strain, at their superplastic temperatures. Each particular alloy undergoes a superplastic transition at a temperature that may readily be measured or determined from sources or by procedures well known to those in the art, for example by reference to M. Hansen, "Binary Phase Diagrams", McGraw Hill 1978. Superplastically deformable alloys of aluminum and titanium are known in the art. A particularly preferred titanium alloy includes aluminum and vanadium, such as alloy Ti6Al-4V, which becomes superplastic at temperatures of about 1435° and bonds at temperatures of roughly 1675°–1725° F. Certain other alloys, primarily of titanium or aluminum but also of other metals may achieve superplasticity by decreasing their grain size, since fine, stable grain size is known to give metals the ability to exhibit superplastic flow.

It is also within the scope of the invention to employ melting point depressants or bonding activators to lower the diffusion bonding temperature of the metal sheet. Such activators are well known and are specific to the metal or alloy involved; for example nickel and/or copper with titanium alloys. The activator is applied to the sheets along the ribbon surface; it migrates into the metal during bonding, so the resulting joint is formed essentially of the titanium alloy alone. A use of bonding activators in blade fabrication is described in "The Rolls Royce Wide Chord Fan Blade", G. Fitzpatrick and P. Broughton, presented at the First International Conference of the Titanium Development Association, San Francisco, Calif., October 1986 and mailed to the Association's membership.

Figure 4:
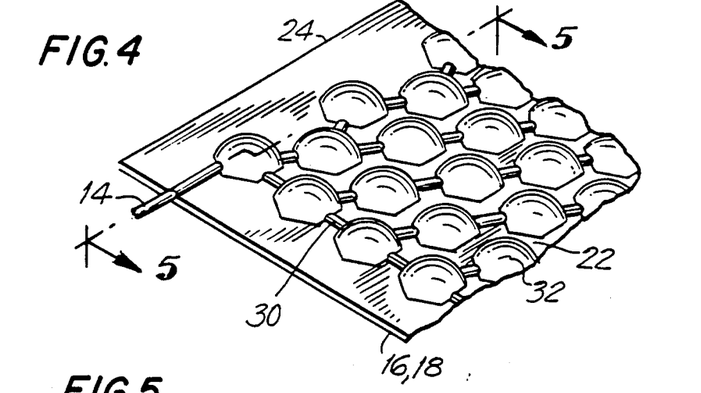
FIG. 4 is a sectional perspective view of the superplastically formed sheets shown in FIG. 3 diffusion bonded together in accordance with the present invention.
Figure 5:
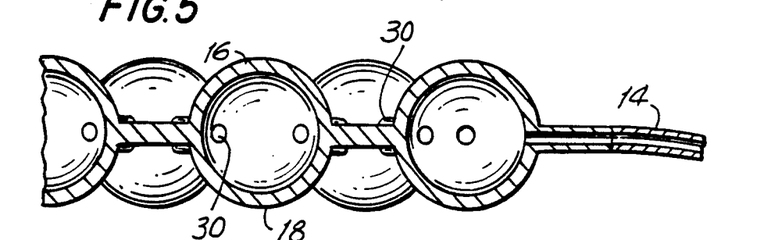
FIG. 5 is a cross-sectional view taken along line 5—5 of FIG. 4.

In a preferred method in accordance with the invention, two metal sheets 16,18 are placed between platens 10 and 12 in a hot press or comparable known apparatus, and the platens brought together against stops to achieve about a 5% upset along the ribbon surface 20. This is preferably done briefly at superplastic temperatures, the object being to deform the metal of sheets 16 and 18 without bonding them. At superplastic temperatures, deformation occurs almost instantaneously, forming the pillow shaped cells 32 shown in FIG. 4. This may be done in an air atmosphere. A substantially longer time will be required below the superplastic transition. The platens are then removed, and the thus formed (but not bonded) sheets 16 and 18 (the formed sheets are shown in FIG. 4; they have essentially the same appearance when placed as shown, whether or not they have been bonded together) may be cleaned for further processing. The sheets may then be locally deformed, for example using a mandrel, to accommodate an inlet tube 14 as indicated in FIG. 4. The sheets are then welded about their periphery, using known welding methods such as electron beam (EB) welding or tungsten inert gas (TIG) welding which do not contaminate the metal surfaces. Tube 14 is also preferably welded in place, using for example a fillet weld, so that the two plates form an airtight internal volume.

A vacuum is then drawn on tube 14, to approximately between $10^{-2}$ and $10^{-3}$ Torr, and the two sheets again placed in the furnace at a temperature and for a time sufficient to produce diffusion bonding, with the platens being maintained at substantially the same degree of closure as that used in the original forming step. The vacuum between the sheets assures adequate bonding along the ribbon surface 22, avoiding unbonded regions that might otherwise be caused by entrapped gas, even in very small quantities. At the same time, the vacuum should not be so high as to collapse the formed pillows.

Note that if platens 10 and 12 are closed or limiting molds, the pillows in being formed may take on a flat-topped hexagonal straight walled shape. Preferably, for titanium, the platen surfaces are lubricated with boron nitride powder, a known dry lubricant, in order to prevent galling of the platen surfaces due to friction with the metal sheets.

Using 0.030 inch titanium alloy Ti6Al-4V sheets in the above-described process, and a 5% upset, with a hexagonal platen configuration, the hexagons being ½ inch between opposing sides and the ribbon width being 0.040 inch, and heating to about 1440° F. for 15 minutes, cells have been observed to form as shown in FIG. 4 to a height of approximately 1/16 inch above the original surface of sheets 16 and 18, for an internal cell depth of about ⅛ inch. By making reliefs 26 about 3/32-⅛ inch wide, bleed ports 30 will be formed having about 1/32-1/16 inch internal diameter, intercommunicating the network of cells thus formed.

The above-described embodiment of the invention is advantageous in that it may be conducted in a standard hot press, with a cycle time at temperature of about one hour. Alternatively, the process may be conducted in a more expensive vacuum press, requiring a longer cycle time. The vacuum within the press serves the same function as described above with respect to the vacuum within the welded preform, namely assuring adequate bonding. Also, in this embodiment the heat and pressure may be maintained long enough in the initial step to afford bonding as well as formation of the interconnected cell structure. For titanium alloy Ti6Al-4V, and a temperature of about 1700° F., the time required for bonding with a 5% upset is of the order of one or two hours. With this embodiment of the invention, the sheets 16 and 18 may at the same time be diffusion bonded in a band about their periphery, rather than being welded. A tube such as tube 14 is preferred but not essential, it being sufficient to leave a gap in the peripheral bond through which the internal preform volume communicates with the vacuum environment of the furnace. Multiple stacked platens may be used, with a press or furnace, each as described above, for increased process efficiency.

Care should be taken to avoid sharp edges in the platens. For example, for a 0.040 inch ribbon surface width, the thickness of the walls between adjacent hexagons in the platen may be 0.1 inch rounded with a 0.032 inch radius. The corners of the hexagons are similarly rounded so as to avoid sharp corners that can lead to high local stress.

It is preferable that tube 14 be fabricated from the same alloy as sheets 16 and 18; however, the tube may be fabricated of any material which can be diffusion bonded or welded to the metal sheets, depending upon the embodiment of the process to be used, and which has a comparable coefficient of thermal expansion and is otherwise compatible with the base metal.

The preform 24 fabricated in accordance with the invention, as described above, may then be inflated, at superplastic temperatures and typically at pressures of about 200 to 300 pounds per square inch of an inert gas such as argon, to form a panel structure, or a core structure of regular or irregular shape. If the two halves of the preform are made but not bonded, as first described above, then when they are reheated for bonding, they may be additionally inflated in the same heat cycle after removal of the platens, as desired. Inflation causes the cells 32 to extend outwardly in both directions from the plane of sheets 16, 18 to some fraction, for example 70-90%, of the ultimately desired degree of elongation. Note that the method permits minimizing the number of temperature cycles required for fabrication, compared with prior methods.

Inflation of the preform may be conducted while it is merely held about its perimeter, in which case the cells will expand equally in their respective directions. Alternatively, the preform may be inflated within a closed cavity mold, so that the cavity walls limit and define the desired shape of the inflated or partly inflated core. Such a mold may, for example, limit expansion to a substantial fraction of that ultimately desired. It may alternatively permit the complete degree of expansion desired, and may also accommodate exterior panels or structural elements which may thus be diffusion bonded to the expanded ends of the cells across the entire area of the latter, leaving the surface between the panels and the core bonded and substantially void free. Alternatively, the preform may be fully inflated in this manner and subsequently bonded to exterior elements. It will be seen that since the expansion is driven evenly and uniformly by gas pressure, virtually any arbitrary core shape may be achieved by correspondingly shaping the mold cavity. Inflation may be carried out in air provided that the degree of inflation is small enough so that no bonding occurs, for example between adjacent cell walls. If any operation is carried out in air, the metal of the sheets or preform must be cleaned of oxides and other impurities by known techniques such as an acid bath before bonding can be properly achieved, as is well known in the art.

The method of the invention is particularly useful for forming compound curvature airfoil structures such as rotor blades or stator airfoils for fans and compressors and integrally bladed discs, often requiring highly curved surfaces, high strength and stiffness, low weight and amenability to inspection of the core at an early stage of manufacture. This is illustrated in FIGS. 6–9.

Figures 7, 8, 9:
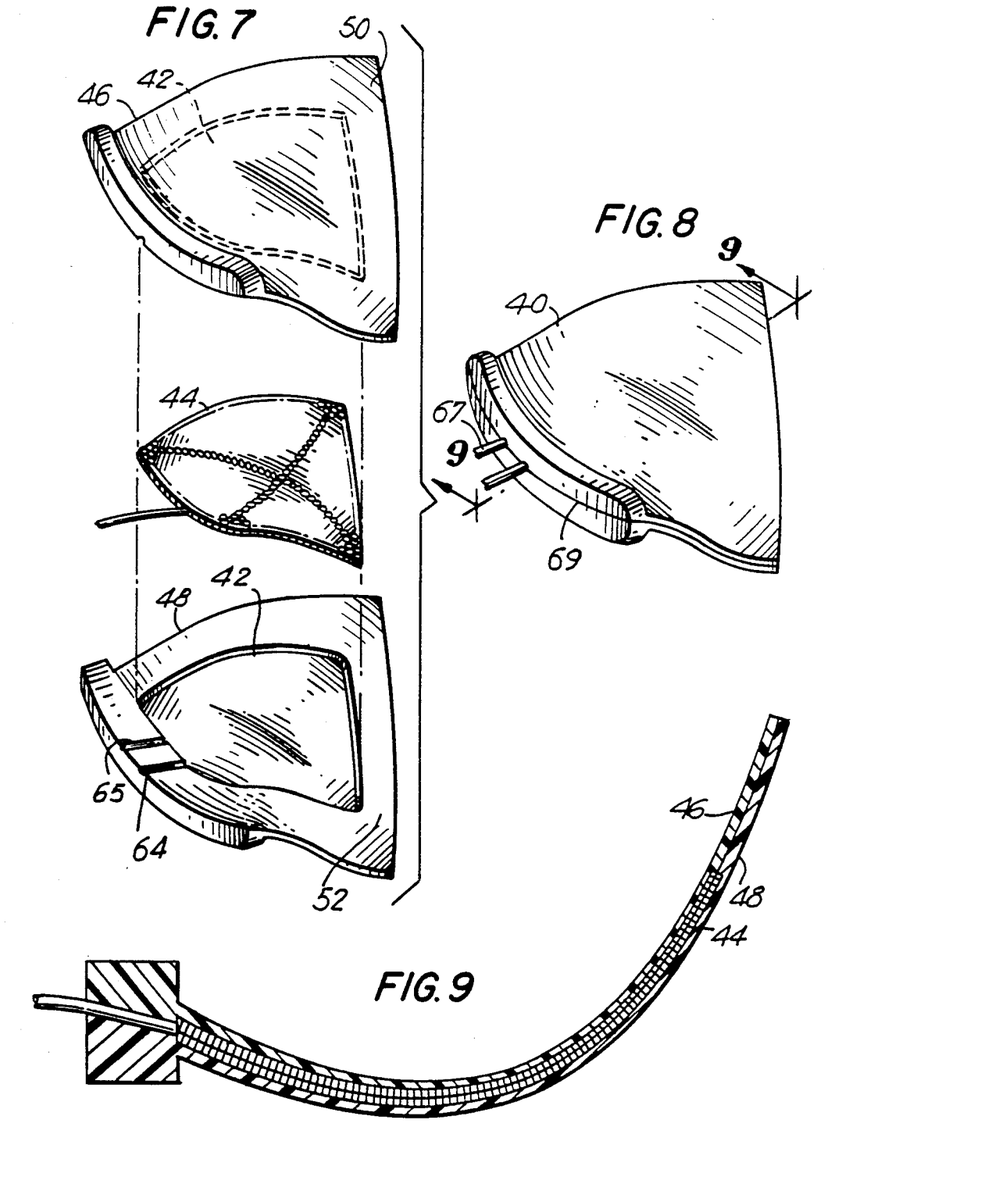
FIG. 7 is a perspective view of an airfoil of the present invention prior to final assembly to illustrate the three primary structural components.
FIG. 8 is a perspective view of the airfoil of FIG. 7, after assembly.
FIG. 9 is a cross-sectional view taken along line 9—9 of FIG. 8.

Preform 24 is first twisted into a shape corresponding substantially to the compound curvature of the inner hollow portion or pocket 42 of airfoil 40. The core as so twisted is indicated at 44, positioned between upper and lower halves 46, 48, respectively, also referred to as upper and lower skins, of airfoil 40. In accordance with the invention, upper and lower skins 46, 48 are diffusion bonded together along their peripheral congruent surfaces 50, 52, and the cavity or pocket 42 between them (preferably extending equally into both skins) is completely filled with cellular core 44, which is expanded to fill that volume and which diffusion bonds completely along its outer surface to the corresponding inner surfaces of the airfoil skins.

Depending upon the degree of compound curvature in the airfoil, it may be preferable to first impart some degree of curvature to the preform in a mold, which may impart all or only a substantial fraction of the ultimately required curvature, the remainder being accomplished by the airfoil skins themselves serving as molds. Alternatively, if only a small degree of compound curvature is required, this may be imparted to the preform by the airfoil skins themselves, without the need for one or more preliminary molding steps to progressively achieve the desired compound curvature.

Figure 6:
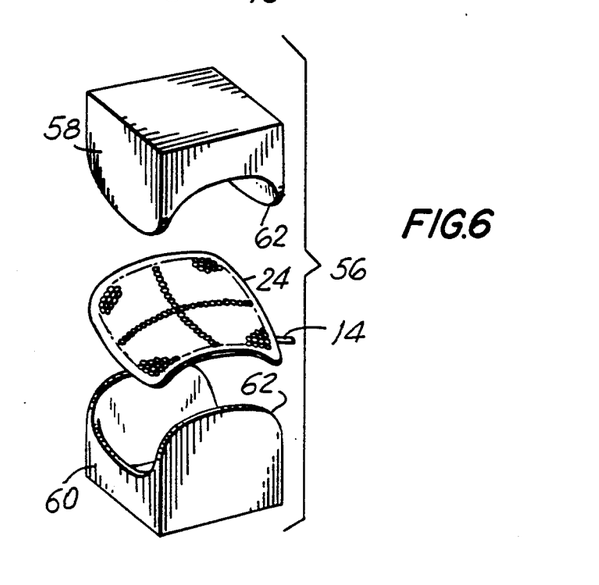
FIG. 6 is a perspective illustration of a mold for forming a bidirectionally curved cellular panel structure in accordance with the present invention.

FIG. 6 is a perspective view illustrating a mold 56 including top and bottom platens 58, 60 defining between them a common peripheral surface 62, when the mold halves are mated, corresponding to the degree of twist, or compound curvature, that it is desired to achieve with the particular molding step. Preform 24 is shown schematically between platens 58 and 60, with tube 14 still in place to allow pressurization of the interior of preform 24. In a furnace, the preform 24 is first pressurized with an inert gas to a few p.s.i. to avoid "kinking", or sharp bending, of the preform as it is curved. The mold halves or platens 58, 60 are then closed upon the preform, at a temperature within its superplastic range, so that the preform takes on the desired twist. Mold 56 may be an open cavity mold, simply for imparting twist to the preform, or it may be a closed cavity mold, its internal surface defining the desired external shape of the core to be formed by inflating preform 24. This may be the finally desired shape for the core, or it may be some substantial fraction, less than all, of the desired degree of inflation. While some degree of inflation may be achieved before all or substantially all of the twist is imparted to the core, the degree of inflation is preferably kept below that at which the side walls of the cells begin to bond with each other until the final degree of twist is achieved. This prevents having to impart twist to the core after the side walls have already bonded, which distorts them and causes unevenness in the thickness of the cells, within the core. For large degrees of compound curvature, a sequence of progressive molds may be employed.

The inflated core 44 is then placed between the airfoil halves 46, 48 and the resultant sandwich pressed together, at temperatures in the superplastic region of both the core and the skins. Fabrication of airfoil skins 46, 48 may be done by any conventional method known to the art, for example by a combination of machining and hot forming. They are preferably made of the same alloy as or one compatible with the core. A channel 65 similar to channel 64 is machined in skin 48 to provide gas communication between the internal volumes formed between the core 44 and the respective skins, so that a vacuum may be produced within this volume in order to achieve complete bonding between the surface of core 44 and the corresponding internal surface of skins 46, 48. This may be done in any of several ways, as will be described. Tube 14 is left in place, through channel 64, to provide a gas path for pressurizing the interior of core 44 to inflate it to completely fill the volume defined between airfoil halves 46, 48. After the structure is formed, the tubes may be removed and the small remaining holes plugged or welded, if desired.

Two ways are described for forming the subassembly of the two airfoil halves and the core 44 into a completed airfoil. In one, the steps are carried out in a vacuum press mold, which provides the requisite temperature and a press, for applying mechanical pressure to the mating peripheries 50, 52 of the airfoil skins under vacuum conditions. The three piece subassembly is placed in the vacuum press mold and tube 14 is connected to a source of inert gas pressure capable of inflating the cells of the core. At temperature, the mold is closed to apply about a 5% upset mechanical pressure to the peripheries 50, 52 of the skins, and inert gas pressure is applied through tube 14 to inflate the core 44 against the internal pocket walls of the airfoil skins. With a 5% upset and a temperature between about 1675° F. and 1725° F., the forming and bonding steps may be completed in about two hours for a typical blade structure as shown in FIGS. 7–9. The vacuum provided by the press is preferably between about $10^{-4}$–$10^{-6}$ Torr. A channel 65 is machined in skin 48 to permit the vacuum provided by the press to communicate with the interior volumes between the core and the respective skins. Such a channel may be machined in either or both of the mating airfoil skins, and more than one such channel may be provided if desired. Alternatively, airfoil skins 46, 48 may be welded about their periphery and evacuated in order to form a vacuum chamber, thereby enabling bonding to take place in a hot press rather than a more expensive vacuum furnace. It is convenient for this purpose to provide a tube 67 welded in channel 5 which may be connected to an appropriate source of vacuum of $10^{-4}$–$10^{-6}$ Torr. This may be done by connecting tube 67 to a source of vacuum before the subassembly is placed in a press, and sealing the tube off so that the desired vacuum is maintained throughout the heat cycle without the need for a vacuum hookup into the press. The core is then inflated, at diffusion bonding temperatures, and fills and bonds to the pocket within the airfoil skins. Note that inflation is always described herein as using inert gas such as argon in order to avoid forming oxides or other contaminants that cannot readily be removed.

The time period during which pressure must be maintained within the core in order to inflate the cells will be apparent to those familiar with this art and will depend upon gas pressure, the particular alloy employed, the thickness of the sheets and the geometry of the particular preform. Note that gas channels or tubes are preferably provided through the route 69 of the airfoil, as shown in FIG. 8, or through the tip, such that they do not traverse areas which may be subject to transverse stress risers.

FIGS. 8 and 9 illustrate the completed airfoil, with the skins bonded together enclosing and bonded to core 44. Importantly, the platen and subsequently core 44 is available for inspection by any of the conventional test methods before it is encapsulated within the airfoil, permitting inspection of the bonds and structural integrity of the core at an early stage of the process. Proper inspection in this manner makes it unlikely that an improperly bonded or formed core may be mated with an airfoil, avoiding unnecessary expense due to rejects and affording a higher degree of structural integrity and safety than is possible with processes that do not permit such early, direct inspection.

Note that two or more cellular cores in accordance with the invention may be bonded together to create reinforcing structures with greater depth or a different shape than may be practicable or desirable with a single core alone.

It will be apparent to those skilled in the art that modifications and variations of the disclosed embodiments may be made without departing from the scope and spirit of the invention, which is intended to be limited solely in accordance with the following claims

What is claimed:

1. A method of fabricating a cellular structure, comprising:
   (a) providing at least one metal sheet capable of undergoing superplastic forming;
   (b) applying pressure to upset said sheet along a ribbon surface defining in its interstices an array of polygonal voids interconnected with one another by reliefs in the ribbon surface, said pressure being sufficient to reduce the thickness of the sheet along the ribbon surface by between a few and about 10%, said pressure being applied at a sufficient temperature and for a sufficient time for the metal to flow into the areas of the polygonal voids and form pillows therein interconnected by channels corresponding to said reliefs, said pillows and channels being raised relative to the ribbon surface.

2. A method as set forth in claim 1 wherein said temperature is sufficient to render the metal sheets superplastic.

3. A method as set forth in claim 2 wherein two metal sheets are provided in face-to-face relation and the pressure to upset them is provided by at least one platen forming said ribbon surface, and an opposing surface, said platen and opposing surface being brought together against positive stops to a separation corresponding to said reduction in thickness.

4. A method as set forth in claim 3 wherein said opposing surface is a planar surface.

5. A method as set forth in claim 3 wherein the opposing surface is a second platen forming a second ribbon surface corresponding to the first ribbon surface of the first recited platen, said platens having corresponding reliefs, such that the two metal sheets subject to such upset pressure between them form pillows raised in opposite directions forming a network of cells interconnected by channels accessible through a port at the periphery of said sheets.

6. A method as set forth in claim 5 wherein such ribbon surface is of substantially constant width between about 1/32 and ⅛ inch, all edges of the platens forming the ribbon surface being rounded sufficiently to avoid sharp corners capable of causing undue stress in the metal sheets.

7. A method as set forth in claim 6 wherein the shape of said polygonal voids is selected from the group consisting of hexagons, octagons, decagons and dodecagons.

8. A method as set forth in claim 3 including maintaining the metal sheets ar said temperature sufficiently long to diffusion bond them together along their ribbon surfaces.

9. A method as set forth in claim 8 where prior to the formed sheets being maintained at said temperature long enough to diffusion bond, they are bonded together about their periphery and provided with means for communicating a source of gas pressure to communicate with the network of cells formed by the sheets.

10. A method as set forth in claim 1 including diffusion bonding a pair of said metal sheets along their ribbon surfaces and along their periphery to form a preform such that the pillow of the respective sheets form a network of cells interconnected by said channels; providing communicating means for controlling the gas pressure within the network of cells; and applying gas pressure to the cells through the communicating means at superplastic forming temperature to expand them in volume.

11. A method as set forth in claim 10 wherein the cells are expanded under pressure against a surface limiting their expansion.

12. A method as set forth in claim 10 wherein the cells are expanded such that substantially all cells on at least one side of the plane of the ribbon are diffusion bonded to adjacent cells to form a cellular reinforcing structure substantially free of voids between adjacent cell walls.

13. A method as set forth in claim 12 including diffusion bonding said hollow core reinforcing structure to one or more additional metal members to form a stiffened, reinforced structure.

14. A method as set forth in claim 13 wherein said one or more additional metal members are diffusion bonded to the ends of the cells such that substantially the entire wall surface of the cells is diffusion bonded without voids to adjacent cell walls or to said metal members.

15. A method as set forth in claim 14 wherein the one or more metal members substantially enclose the entire cellular reinforcing structure to form a hollow core reinforced structure.

16. A method as set forth in claim 15 where the additional metal members comprise airfoil skins and the resulting structure is a hollow core reinforced airfoil.

17. A method as set forth in claim 10 including the step of placing the preform, at superplastic temperature, between forming dies shaped to produce a curvature in the plane of the preform.

18. A method as set forth in claim 17 including introducing positive gas pressure into the network of cells prior to deformation of the preform by the forming dies, and increasing the gas pressure after such curvature has been produced to superplastically expanded the volume of the cells.

19. A method as set forth in claim 18 wherein said forming dies are shaped to produce a compound curvature in the preform.

20. A method as set forth in claim 16 including the step of placing the preform, at superplastic forming temperature, between a pair of airfoil skins having a pocket between them with compound curvature; introducing a positive pressure within the cells of the preform; placing the preform in the pocket within the airfoil skins and bringing the skins together to mold the preform to a compound curvature corresponding to that of the pocket; and inflating the preform to conform and diffusion bond its exterior surface to the interior walls of the skins of said pocket.

21. A method as set forth in claim 15 including inspecting the preform for bond and structural integrity before it is bonded to the one or more metal numbers.

* * * * *

UNITED STATES PATENT AND TRADEMARK OFFICE
CERTIFICATE OF CORRECTION

PATENT NO. : 4,934,580

DATED : June 19, 1990

INVENTOR(S) : Marvin M. Sutton

It is certified that error appears in the above-identified patent and that said Letters Patent is hereby corrected as shown below:

The Drawing Sheet, consisting of FIGS. 1A and 1B, should be added as shown on the attached page.

Signed and Sealed this

Thirtieth Day of June, 1992

Attest:

DOUGLAS B. COMER

*Attesting Officer*     *Acting Commissioner of Patents and Trademarks*

FIG.1A

FIG.1B

UNITED STATES PATENT AND TRADEMARK OFFICE
CERTIFICATE OF CORRECTION

PATENT NO. : 4,934,580
DATED : June 19, 1990
INVENTOR(S) : Marvin M. Sutton

It is certified that error appears in the above-identified patent and that said Letters Patent is hereby corrected as shown below:

On the title page, item [56], OTHER PUBLICATIONS, page 2, column 2

F. Haflich and S.L. Jones, SPF Use on Structural Parts to Debut on F-15E Fighter, American Metal Market/Metalworking News (Nov. 3, 1986).

| | |
|---|---|
| Column 4, Line 54: | ...exterior structural elements. If confined expansion,... |
| Column 5, Line 8: | ...drawings. For some applications,... |
| Column 5, Line 12: | ...sides. Octagons, decagons and... |
| Column 7, Line 23: | ...tube 14... |
| Column 7, Line 29: | ...tube 14... |
| Column 14, Line 15: | ...the metal sheets at said... |
| Column 14, Line 28: | ...that the pillows of... |

Signed and Sealed this

Fifth Day of October, 1993

*Attest:*

BRUCE LEHMAN

*Attesting Officer*      *Commissioner of Patents and Trademarks*